(12) United States Patent
Wilson et al.

(10) Patent No.: US 6,251,495 B1
(45) Date of Patent: Jun. 26, 2001

(54) LOW EMISSIVITY PRODUCTS AND METHODS FOR MAKING SAME

(75) Inventors: Elwin R. Wilson, Portland; Yi Pygn Fang, Lake Oswego, both of OR (US)

(73) Assignee: Louisiana-Pacific Corporation, Portland, OR (US)

( * ) Notice: Subject to any disclaimer, the term of this patent is extended or adjusted under 35 U.S.C. 154(b) by 0 days.

(21) Appl. No.: 09/360,295

(22) Filed: Jul. 22, 1999

(51) Int. Cl.$^7$ ................................ B32B 3/24; B32B 31/00
(52) U.S. Cl. ...................... 428/133; 428/464; 428/137; 428/131; 428/132; 428/138; 156/253; 52/408; 52/409; 52/411
(58) Field of Search ........................... 428/133, 138, 428/132, 131, 137, 464; 156/253; 52/408, 409, 411

(56) References Cited

U.S. PATENT DOCUMENTS

| | | | |
|---|---|---|---|
| 3,443,349 | * 5/1969 | Mahle | 428/133 |
| 4,326,909 | * 4/1982 | Slavik | 156/253 |
| 5,231,814 | * 8/1993 | Hageman | 52/408 |

* cited by examiner

*Primary Examiner*—William P. Watkins, III
(74) *Attorney, Agent, or Firm*—Marger Johnson & McCollom, P.C.

(57) ABSTRACT

This invention relates to a method for producing a product which exhibits (a) a low level of emissivity and (b) a high level of moisture vapor permeability, and which enables trapped excess moisture to be transported from the product to the surrounding atmosphere while maintaining its effective radiant barrier properties. The product is an underlying substrate, having a pair of outer major surfaces and a radiant barrier material adhered to at least one of the pair of outer major surfaces of the underlying substrate with an adhesive material to form a radiant barrier material covered substrate. A plurality of apertures are formed in the radiant barrier material covered substrate. These apertures extend substantially completely through both the radiant barrier material and the adhesive material thereby forming substantially completely open moisture vapor flow channels which create a high level of moisture vapor permeability through the radiant barrier material and the adhesive material. In this way, a substantial amount of trapped excess moisture can pass from the underlying substrate into the surrounding atmosphere to avoid unwanted degradation of the underlying substrate, while maintaining the low level of emissivity of the product.

47 Claims, 4 Drawing Sheets

LOW EMISSIVITY PRODUCTS AND METHODS FOR MAKING SAME

BACKGROUND OF THE INVENTION

This invention relates to products having a low degree of emissivity, and to methods for producing same, and in particular to low emissivity products which also exhibit a high level of moisture vapor permeability.

As pointed out in U.S. Pat. No. 5,231,814 ("U.S. '814"), which is incorporated herein in its entirety by reference, and which is owned by the assignee of this patent application, roof decking typically is formed of structural wood products, such as plywood or oriented strand board ("OSB"). These structural wood products are attached to the structural members of a house by nails or other fastening means.

This roof decking defines the confines of the roof of the house and serves as the substrate for joining the outer protective water-shedding materials, i.e., the tar paper and shingles, which are attached thereto and complete the protective roof assembly.

This roof structure is formed of materials which inherently have minimal thermal insulating and emissivity barrier properties. Therefore, heat transfer through the roof structure from the outdoors to the interior space of, for example, a home, particularly during the summer months, is a problem to homeowner. Either a homeowner undergoes severe discomfort due to elevated temperatures inside the house, or they must pay a high price for installing and operating air conditioning.

Prior to the product described in U.S. '814, the insulative solar or heat emitting properties of a structural roof have undergone limited improvements such as by applying insulative materials to the exterior of the roof decking under the outer protective materials.

Excess heat transfer is generated on a daily basis in the summer months, which penetrates into the interstices of building materials such as sheet rock and insulation causing unwanted elevated temperatures within the interior living space.

Thus, under conventional home construction conditions, the air temperature in attics and ceilings can be raised to about 140 degrees F. or higher.

U.S. '814 addresses certain problems relating to heat transfer. In U.S. '814, a roof structure is fitted with roof decling comprising a sheet of plywood or OSB with a layer of foil material adhered thereto. The foil material comprises a layer of metallic foil such as an aluminum foil material. The foil material covers a roof decking material which in turn is fastened to rafters in a typical roof structure.

The foil material used in U.S. '814 includes a plurality of substantially uniformly distributed perforations which are preformed in the foil material prior to applying of the adhesive, and adhering same to the underlying substrate, i.e., OSB, plywood. The expressed reason for introducing the perforations into the foil material is to permit the passage of moisture between the moisture barrier layer and the roof In this way, it is thought that a significant portion of excess moisture can be released through the perforations located in the foil material thereby permitting the roof decking to "breathe." If a significant portion of the excess moisture is not released, unwanted degradation of the substrate can result.

Moisture can be present due to, for example, water vapor which enters the house during construction (before the roof is put on), or after construction from roof leaks of various types. Unwanted moisture can also result from the cumulative effect of vapor condensation.

Typically, the decking is placed in position with the foil layer facing inwardly toward the attic of the house. The low emissivity foil faces at least one adjacent air space (the attic) to prevent unwanted heat transfer.

A partial sectional view of the roof decking structure is shown in FIG. 1 of U.S. '814. A plan view of the decking structure of FIG. 1 is illustrated in FIG. 2, which shows the perforations in approximately true scale. As shown in FIGS. 2 and 3, the perforations extend only through metallic foil 16 and not through the kraft paper 17 to which the foil is attached. The kraft paper is, in itself, capable of breathing. It is stated in U.S. '814 that kraft paper 17 need not be perforated, although perforations through or partly through the paper are not particularly detrimental. The kraft paper is provided for physical support of the foil during the handling, which precedes attachment of the foil material to the panel structure.

The density of perforations is in the order of 125 per square inch, although perforations in the range of from about 50 to about 160 per square inch are usable. Each perforation is about 0.06 mm or less in diameter.

SUMMARY OF THE INVENTION

It has now been discovered that the method of U.S. '814 forms a radiant barrier material covered product which exhibits certain performance limitations with respect to the structure of the U.S. '814 product.

It is generally recognized that openings in a radiant barrier sheet will increase the level of moisture vapor permeability from the radiant barrier covered substrate. However, it is recognized in the prior art that an increase in the size and/or number of the apertures in a radiant barrier sheet will lower the level of emissivity of the radiant barrier covered substrate.

In the method of the present invention, a radiant barrier covered substrate is formed by joining the radiant barrier covering to an underlying substrate. The joining operation can, for example, be accomplished by bonding the radiant barrier covering to an underlying substrate. This is typically done using an adhesive material as the bonding agent.

Applicant has recognized that various problems can occur in the formation process of U.S. '814 which adversely effects the structure described in U.S. '814. For example, when the radiant barrier layer is joined to the substrate using the previously described adhesive material and the method set forth in U.S. '814, a substantial number of the perforations located in the foil material can become wholly or partially plugged by the adhesive material. This plugging problem, when it occurs, limits moisture vapor permeability from the substrate thereby reducing the amount of excess moisture which can be transported through the perforations located in the foil material thereby constraining breathing of the roof decking.

Another problem in the method of U.S. '814 concerns overlay paper 17. Specifically, overlay paper 17 can undergo a substantial reduction in breathability.

This occurs after an adhesive material is applied and saturates the overlay paper 17. The above-described problems uncovered by applicants have been overcome by the methods and products of the present invention. Thus, the product of this invention is designed to exhibit a relatively high level of moisture vapor permeability, while also maintaining a low level of emissivity comparable to that which is described in U.S. '814. The product of the present invention effectively and efficiently deters the transfer of heat into the living space of the house during the summer months. At the same time, the subject product is designed to permit moisture vapor to be transported from the underlying substrate so that it will pass through the radiant barrier covering material via the apertures located therein. In this way, undesirable degradation of the underlying substrate, typically in the form of moisture-related decay, can be substantially reduced employing the subject method and product.

This invention is directed to a radiant barrier covered product. Typically, the product comprises a radiant barrier layer adhered to an underlying substrate. Preferably, the underlying substrate, which can be either structural or non-structural in nature, can be formed of a variety of materials such wood or wood substrate products, or mineral or polymeric substrate products. The underlying substrate is most preferably formed of a structural wood panel such as OSB, plywood or the like. The underlying substrate can also be selected from a group which includes moisture-containing substrates, permeable substrates, and substrates which are both moisture-containing and permeable.

The underlying substrate is overlaid with a radiant barrier material, preferably a foil layer, which is adhered thereto, or a radiant barrier-coating layer. The product of this invention exhibits a combination of a high level of moisture vapor permeability, on the one hand, and on the other hand, excellent emissivity properties that emulate those of the prior art U.S. '814 structures. Stated another way, a maximum amount of moisture can be released from the product of the present invention, while at the same time the desirable low emissivity effect of the barrier layer material can be maintained. Thus, the products of the subject invention exhibit an optimum combination of low emissivity and a high level of moisture vapor permeability which causes excess moisture to be transported to the surrounding atmosphere from the product.

Accordingly, a method is provided for producing the novel product described above. The method comprises providing an underlying substrate having a pair of outer major surfaces. Then, a radiant barrier material is applied to at least one of the pair of outer major surfaces of the underlying substrate with an adhesive material to form a radiant barrier material covered substrate. Finally, the product of the present invention is formed by introducing a plurality of apertures into the radiant barrier material covered product so that the apertures extend substantially completely through the radiant barrier material, substantially completely through any intermediate layer such as paper or the like, as well as substantially completely through the adhesive material, thereby forming substantially completely open moisture vapor flow channels.

The method preferably comprehends introducing the apertures into a radiant barrier layer covered underlying substrate by perforating the barrier layer material, any intermediate layer such as paper or the like, and the adhesive material. Preferably, the apertures extend through at least one of the outer major surfaces of the underlying substrate. The method of this invention preferably provides for apertures which are shaped in a substantially non-circular pattern. The subject method can also be conducted in a manner in which the amount of the radiant barrier material which is removed from the product during forming of the apertures is minimized. In this way, the low level of emissivity of the product is maintained. Preferably, the step of introducing the plurality of apertures into the radiant barrier material comprises moving a portion of the radiant barrier material over the apertures, or within the confines of the apertures, for facilitating the low level of emissivity of the product. More preferably, the step of introducing the plurality of apertures into the radiant barrier material comprises moving a portion of the radiant barrier material into the confines of the apertures and maintaining the radiant barrier material portion therein without picking a substantial amount of the radiant barrier material portion from within the confines of the apertures thereby facilitating the low level of emissivity of the product.

In one method of the subject invention, wherein a radiant barrier material is adhered to an underlying substrate by a curable adhesive material, apertures are introduced thereinto prior to completion of the process of curing of the adhesive material.

The method of the present invention can preferably be conducted so that the average Moisture Reduction of trapped excess moisture, after 26 days of drying at 80 degree F. and 40% humidity, which passes from within the interstices of the underlying substrate of a product into the surrounding atmosphere (see EXAMPLE 1), is at least about 35%, more preferably at least about 40%, and most preferably at least about 50%, of the amount of trapped excess moisture which passes from within the underlying substrate per se (without a radiant barrier adhered thereto) under the same drying conditions. As hereinafter indicated in EXAMPLE 1, the average Moisture Reduction for samples which replicate the method of U.S. '814 was only 17% (foil having circular-shaped apertures located therein applied with an adhesive to an underlying substrate).

Moreover, the emissivity of the structural composite product formed by the subject invention is generally maintained at a relatively low level in spite of the fact that apertures have been introduced into the radiant barrier layer. Thus, the average emissivity of the composite product of the present invention is preferably not more than about 0.05, more preferably not more than about 0.045, and most preferably not more than about 0.04.

The foregoing and other objects, features and advantages of the invention will become more readily apparent from the following detailed description of a preferred embodiment of the invention which proceeds with reference to the accompanying drawings.

DETAILED DESCRIPTION OF AN EXEMPLARY EMBODIMENT

Figure 1:
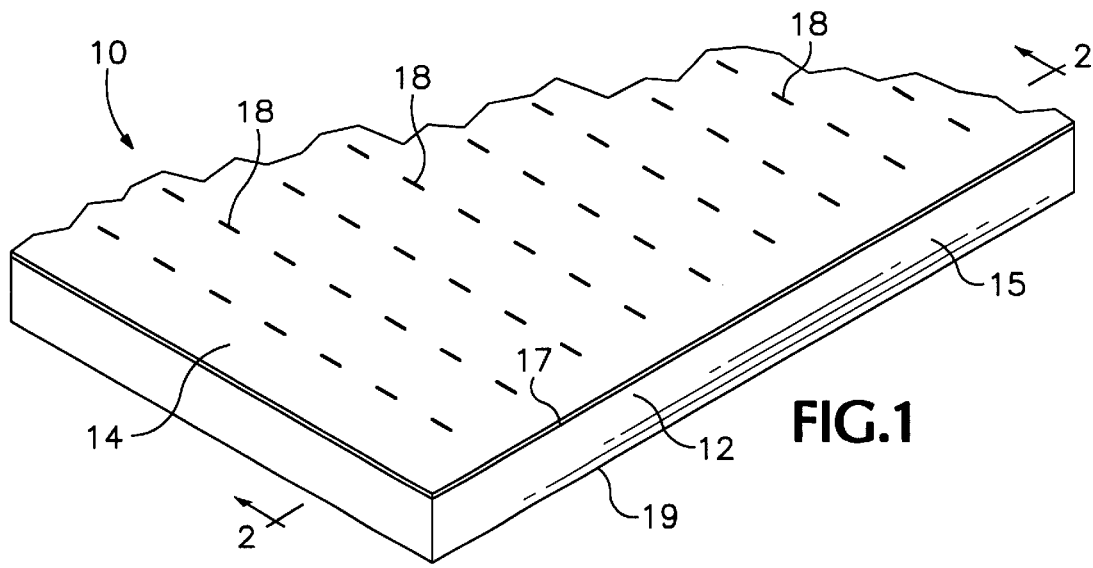
FIG. 1 is a perspective schematic view of a preferred product of this invention having a preferred aperture pattern.
Figure 2:
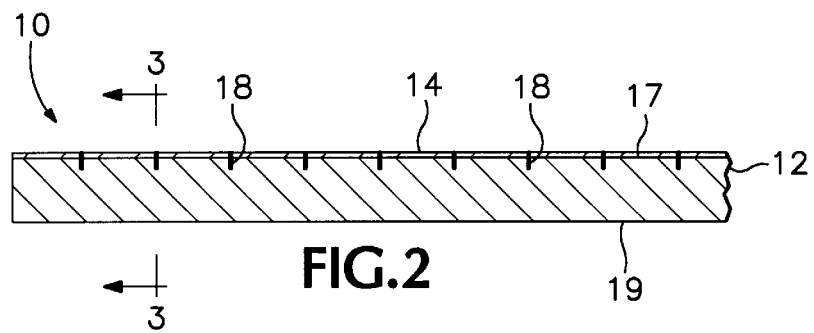
FIG. 2 is a sectional schematic view of the product of FIG. 1 taken along line 2—2.

Referring now to FIGS. 1 and 2, a product 10 of this invention is depicted in which a radiant barrier material 14 is adhered to a underlying substrate 12 to form a radiant barrier covered underlying substrate 15. The underlying substrate 12 has a pair of outer major surfaces 17 and 19. Radiant barrier material 14 is adhered to major surface 17 of the underlying substrate 12. The radiant barrier material 14 can be a foil material, preferably metallic foil, and more preferably an aluminum foil material. Radiant barrier material 14 can also include a backing layer (not shown), such as kraft paper or the like.

The underlying substrate 12 is preferably chosen from a wide variety of structural or non-structural products which are commercially available such as the wood-based structural substrate described above.

The radiant barrier material 14 is generally adhered to underlying substrate 12 using a commercially available adhesive. For instance, a commercial polymeric material such as a water-based EVA glue material can be employed herein.

A plurality of apertures 18 are located in the radiant barrier covered product 15. This allows the composite product 10 to permit a substantial amount of moisture to pass from within the underlying substrate 12 into the surrounding atmosphere. The apertures 18, which are in the form of perforations, and preferably in the form of incisions, extend substantially completely through a radiant barrier material 14, and substantially completely through the outer major surface 17 (and a paper backing layer if it is provided), into the interstices of the underlying substrate 12. In this way the apertures 18 provide flow channels for escape of the moisture which exists within the interstices of the moisture-containing underlying substrate 12. The high degree of effectiveness of these moisture flow channels has been previously described and is further illustrated below in EXAMPLE 1.

At the same time that the moisture permeability properties of the product 10 have been substantially increased through the incorporation of the above-described moisture flow channels, particularly as compared to the perforated foil covered product of U.S. '814, a low degree of emissivity of said radiant barrier material has nevertheless been maintained The specifics of this phenomenon have been discussed previously, and will be further described below and illustrated in EXAMPLE 1.

Figure 3:
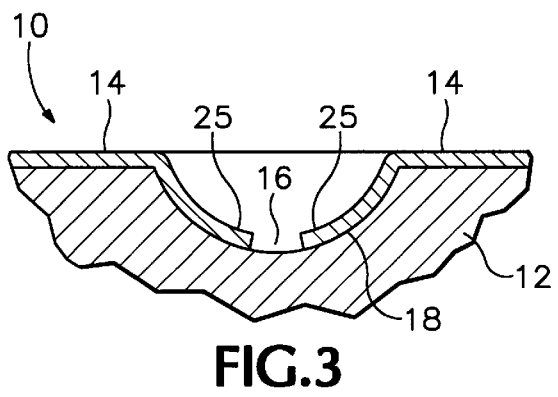
FIG. 3 is an enlarged sectional schematic view of the product of FIG. 2 taken along line 3—3 which depicts portions 25 of radiant barrier material 14 extending within the confines of aperture 18.

In FIG. 3, the configuration of an exemplary aperture 18 is provided. More specifically, substantial portions 25 of radiant barrier material 14 are moved to within the confines of aperture 18. An opening 16 is provided for moisture release from substrate 12.

Figure 4:
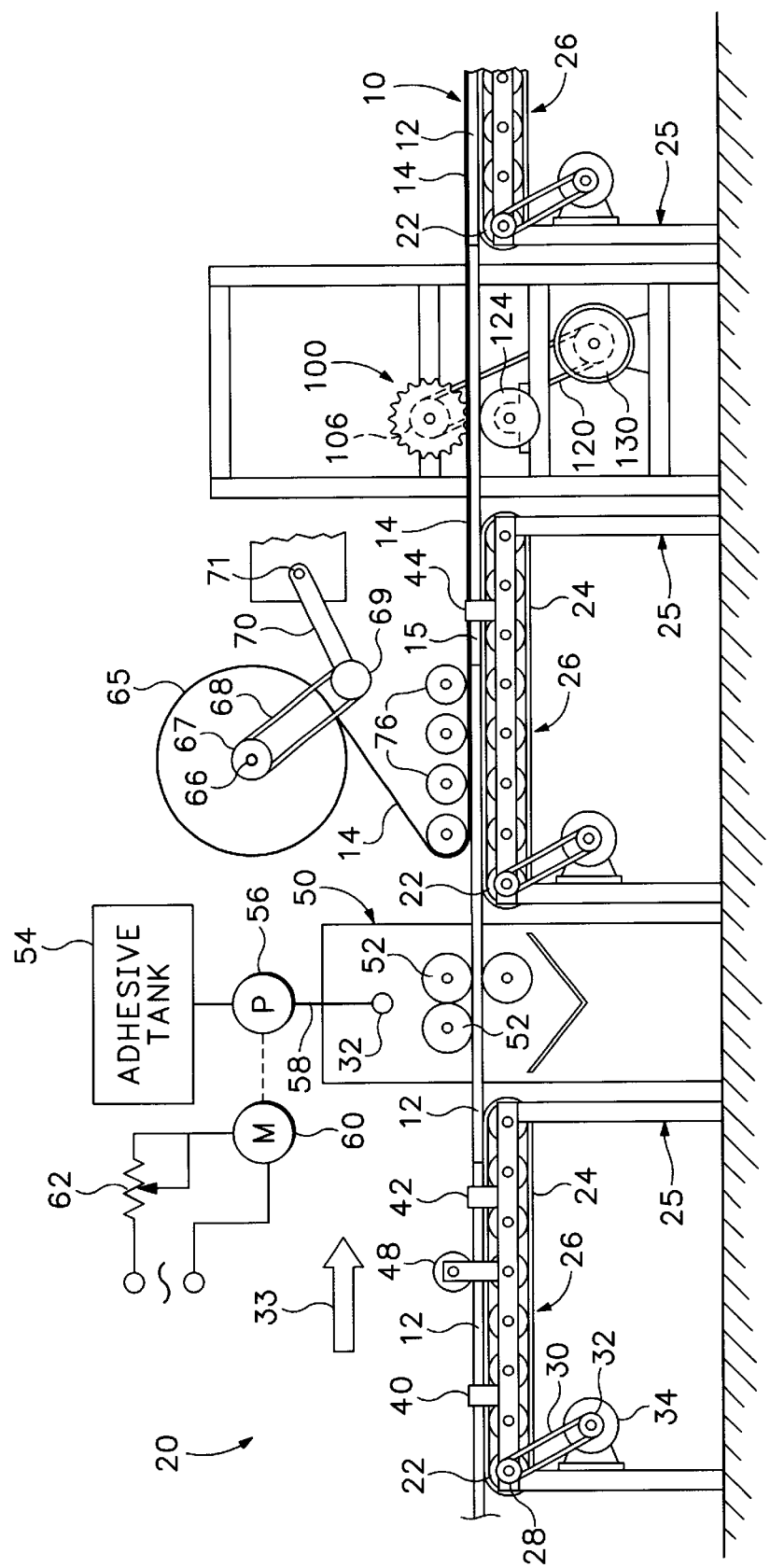
FIG. 4 is a schematic side elevation view of an exemplary system for producing product 10 of the present invention.

An exemplary apparatus, generally designated 20, for applying a radiant barrier material 14 to a underlying substrate 12 to form a radiant barrier-covered underlying substrate 15, and then for perforating the resultant substrate 15, to form product 10 of this invention, is illustratively shown in FIG. 4. At opposite ends of apparatus 20 comprises drive rollers 22 which are rotatably mounted on a structural framework 25. Each of these rollers is typically a steel roller.

Endless conveyers 26 including roller 22 and conveyer belts 24, form the upper portion of the top surface of apparatus 20. For each conveyer 26, a roller 22 is provided with a pulley 28, which is coupled by a V-belt 30 to a similar pulley 32 on a drive motor 34 which is supported on the framework 25. The conveyers 26 are driven so that the portion extending along the top of the apparatus 20, which receives and drives the underlying substrates 12, moves in the direction of arrow 33. A plurality of guide members such as rollers 40, 42 and 44 are spaced along the lateral edges of the apparatus 20. The inner surfaces of the pairs of rollers are spaced apart to engage and guide the side edges of the underlying substrates along the apparatus 20. As each underlying substrate 12 enters the apparatus 20 (at the left in FIG. 4), a conveyer 26 pulls the underlying substrate 12 under a first roller 48 which is a press roller comprising a steel pipe the exterior of which is wrapped with a layer of vinyl nitrite neoprene foam. Press roller 48 has a shaft at each end, these shafts being journaled in a well-known fashion on pillow blocks fastened outside of the guide. The function of roller 48 is to press the underlying substrate 12 onto the conveyer belt so that it can be pulled through the subsequent portions of the apparatus 20. The pillow blocks which rotatably support the ends of roller 48 can be mounted on sliding square tubing to permit vertical motion of the roller as underlying substrate 12 passes under it to accommodate underlying substrates 12 of different thicknesses.

A glue application system 50 follows the press roller. The glue application system includes glue rollers 52 that are steel tubes covered with polyurethane foam. The function of these glue rollers 52 is to apply a uniform coating of adhesive to the upwardly facing major surface of the underlying substrate 12. These glue rollers 52 can also be mounted to be adjustable for different thicknesses of underlying substrates 12 with sliding square tubing arrangements that will permit vertical motion of the rollers 52. Located directly above glue rollers 52 is a glue dispenser pipe 32, which can be a PVC pipe. Pipe 32 has substantially the same length as the glue rollers. The glue pipe 32 has a plurality of spaced holes along the bottom of the pipe. The glue pipe 32 can be supported above glue rollers 52 by a suitable support frame (not shown).

An adhesive tank 54, mounted at some convenient location near the table, contains a supply of a suitable glue, which can be a curable water-soluble adhesive such as a polyvinyl acetate adhesive. A pump 56 is connected to tank 54 and pumps glue to pipe 32 through a supply tube 58. Pump 56 fills pipe 32 with the glue, which drips from the holes along the bottom onto the glue rollers. The glue rollers' foam becomes saturated and, as the underlying substrate 12 rolls through the machine, the rollers 52 apply the glue to the surface of the underlying substrate 12.

The amount of adhesive, which is applied to the underlying substrate 12, is controlled by the speed of pump 56, which is preferably a positive displacement pump. Pump 56 is controlled by a variable speed motor 60 the speed of which is controlled by a rheostat 62. A suitable motor for driving the pump is an AC/DC gear motor directly coupled to the pump. As the motor and pump increase speed, the supply of adhesive to the glue roller is increased. A supply roll 65 of radiant barrier material 14 is rotatably supported on a tubular roller 66 supported on a support frame (not shown) above the apparatus 20. The supply roll 65 is free-wheeling and the rotation thereof is controlled by an adjustable friction clutch which includes a pulley 67 attached to the end of pipe 66. A belt 68, which passes around pulley 67 and around a non-rotatable pulley 69, is mounted on an adjustable arm 70. Arm 70 is pivotable about a pivot point 71, which is attached at a fixed location. Pulley 67 rotates with the supply roll 65 of the radiant barrier material 64 and tends to carry belt 68 along with it. However, friction between belt 68, non-rotatable pulley 69 and pulley 67, to the extent that the pulley and belt speed are different, creates a drag which can be adjusted by the angular position of arm 70 to limit freewheeling and uncontrolled dispersing of the material from the supply roll 65.

The radiant barrier material 14 is fed under a series of press rollers 76 which press it onto the upper surface of the underlying substrate 12 to which glue has been applied. The press rollers comprise steel shafts the ends of which are journaled in suitable pillow blocks. Fibrous rollers surround the press rollers to provide pressure against the foil material web without scuffing or wrinkling the aluminum sheet. Again, the press rollers 76 can be mounted on sliding square tubing to permit vertical motion as the underlying substrate passes under the rollers. The product exiting press rollers 76 is radiant barrier material covered product 15.

As shown in FIGS. 3–6, the radiant barrier material covered product 15 is formed into a product 10 by introducing a plurality of apertures 18, preferably in the form of incisions, which extend through both the radiant barrier material 14 and the outer major surface 17 of the underlying substrate 12 employing a roll assembly 100. Roll assembly 100 comprises a cylindrical metal roll 104 having affixed to the metal roll outer surface 108 a plurality of rows of spaced apart teeth 102.

Figure 5:
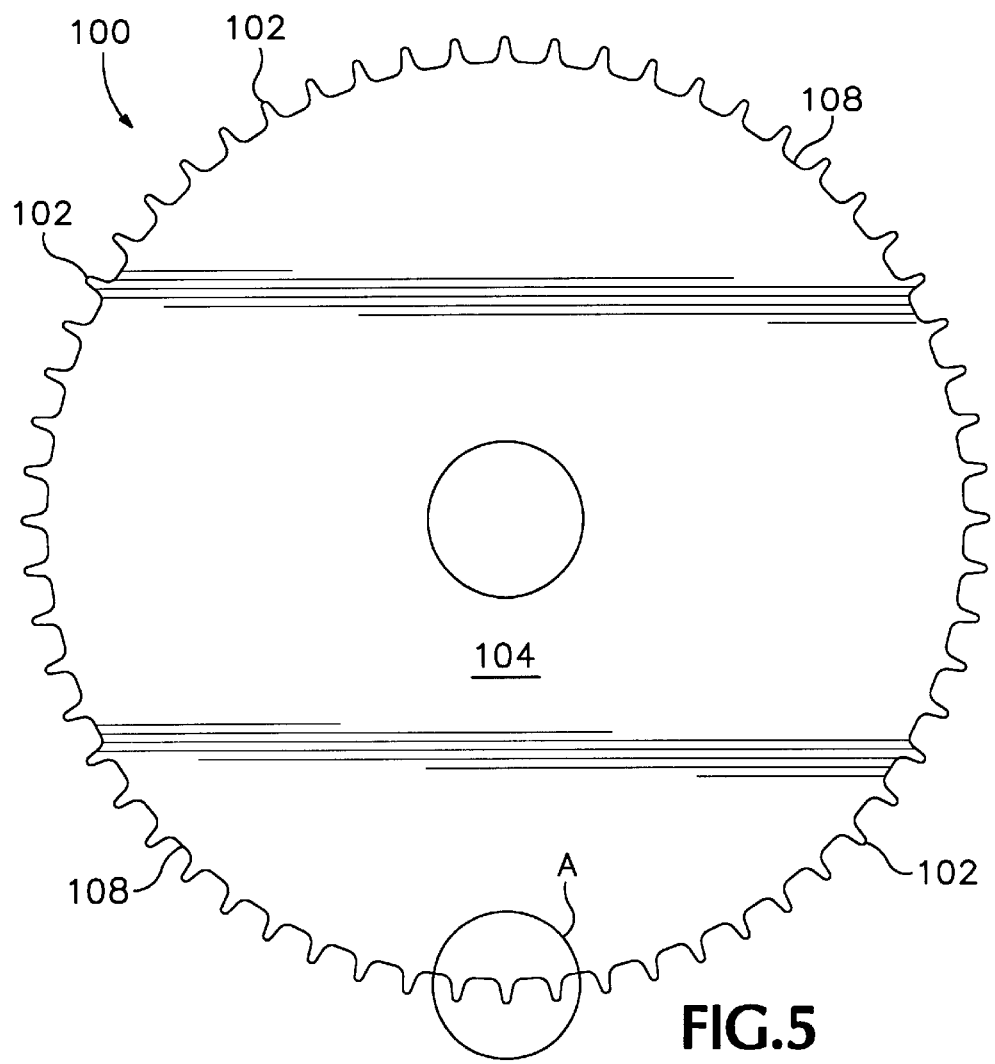
FIG. 5 is an enlarged schematic view of the apparatus 100 of FIG. 4 for introducing apertures into a radiant barrier material covered product.

The arrangement of the spaced apart teeth 102 contemplates attachment on roll surface 108 in a preferred predetermined pattern (see FIGS. 5 and 6 ) which is designed to produce a specific corresponding predetermined pattern of apertures 18 in the radiant barrier material covered product (see FIG. 1) resulting in a plurality of designatedly placed exit moisture flow channels. The detail of a preferred design of the teeth 102 is shown in FIG. 5. That design comprises teeth having outwardly-extending, inwardly-directed sides 112, which together form a curved outer tip 110. The teeth 102 are specifically designed for introducing apertures 18 into the radiant barrier material covered substrate 15 and for moving a portion of said radiant barrier material 25 into the confines of said apertures (see FIG. 3). This is accomplished without subsequently picking a substantial amount of said radiant barrier material portion 25 from within the confines of the apertures 18 when the teeth 102 exit the confines of the apertures 18. In this way the apertures 18 are at least partially filled with said radiant barrier material and a high reflectance level is maintained in the product 10.

The roll assembly 100 is rotatably supported on a pulley 106 which in turn is supported on a support frame (not shown) above apparatus 20. The pulley 106 is coupled by a belt 120 to a drive motor 130 for driving roll assembly 100. During the incision process the radiant material covered product's 15 position is maintained by a backing roll 124.

Figure 6:
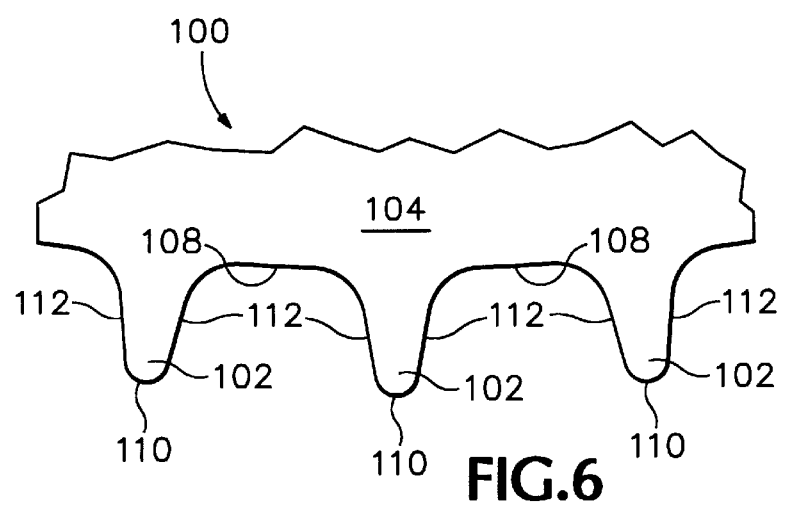
FIG. 6 is an enlarged detailed view of the portion of apparatus 100 encompassed within circular section A of FIG. 5.
Figure 7:
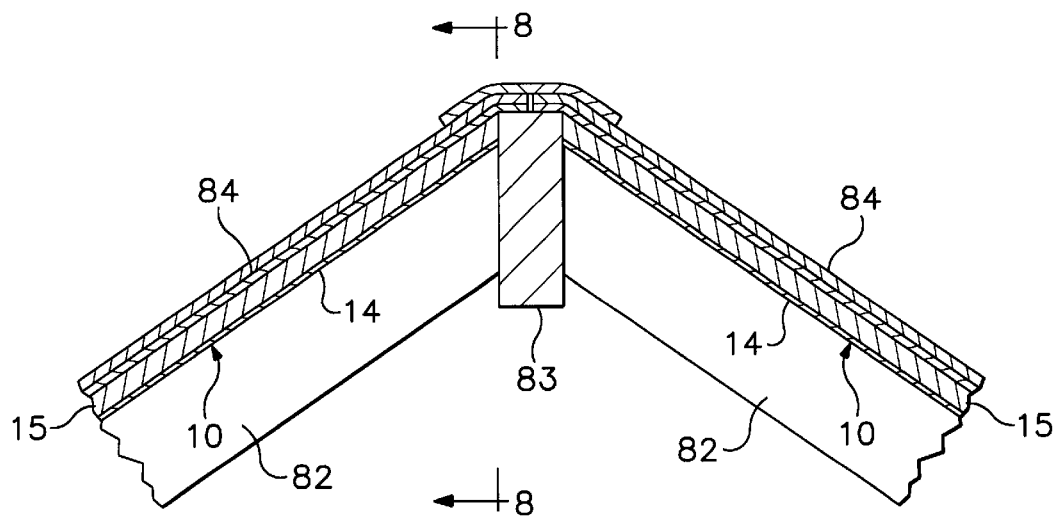
FIG. 7 is a sectional view of a typical roof structure incorporating decking material produced in accordance with the present invention.
Figure 8:
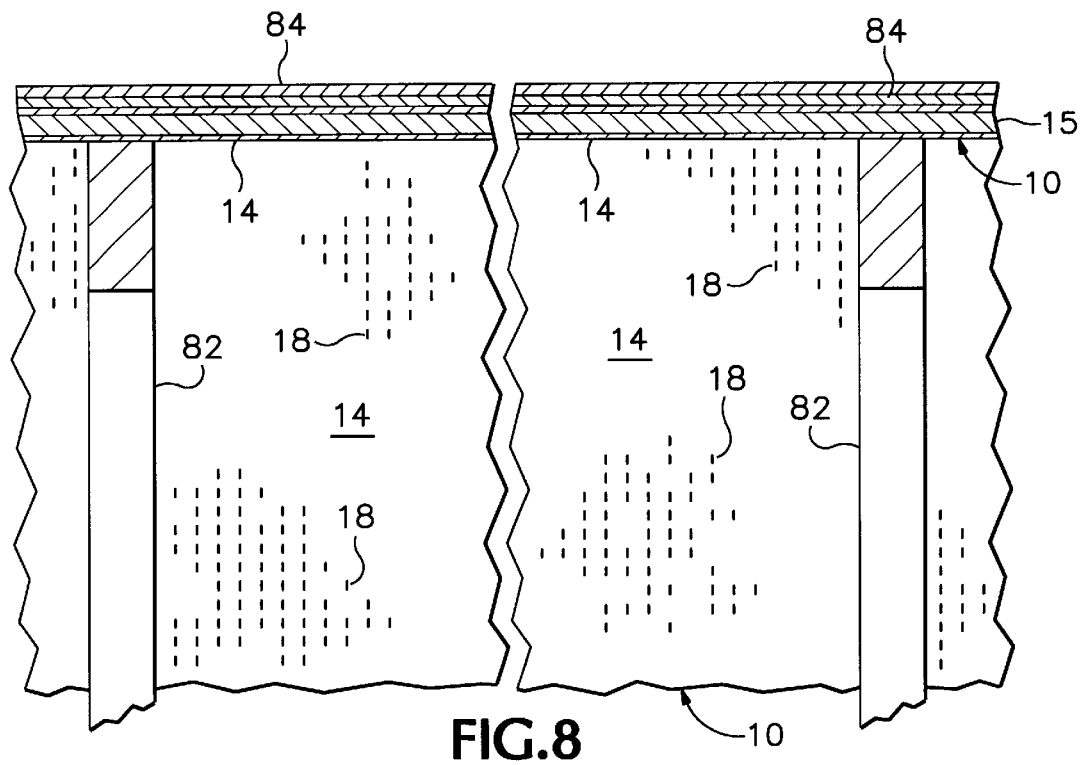
FIG. 8 is a sectional view taken along line 8—8 of FIG. 7 configuration.

Underlying substrates 15 are continuously fed through the apparatus 20, each piece abutting the piece preceding and following it. As the underlying substrates leave the composite product 10 formation area, the radiant barrier material 14 extending from one sheet to the next is cut by a razor knife at the abutting ends. FIGS. 6 and 7 show sectional views through a portion of a typical roof of a house employing the product 10 of the present invention. A plurality of rafters 82 extend between a ridge beam 83 or the like (not shown) and a top plate or hammer beam (not shown) in a conventional manner to form a support, usually sloping, for other roofing material. Sheets of product 10 are attached to those rafters. In accordance with this invention, product 10 is attached to the rafters so that the radiant barrier material 14 faces inwardly toward the attic or other space immediately below the roof structure. As described above, the substrate 15 is provided with exit flow channel to allow "maximum breathing" of the underlying substrate 12. Tarpaper, shingles and other roofing material 84 is then attached to the outer surface of the product 10, as desired.

It is particularly important to recognize that the emissivity barrier side of the product 10 face inwardly and that its exposed surface, i.e., the downwardly facing surface opposite that attached to the underlying substrate, be uncovered and exposed to the air within the attic except, of course, in those small regions where it lies against the surfaces of the supporting rafters 82. In this fashion, the emissivity barrier acts as a low-emission radiator, transferring minimal energy by radiation into the attic space and reducing the attic temperature drastically from that existing when the underlying substrate 12 per se is used.

EXAMPLE 1

A series of experiments has been conducted on OSB substrates with and without a radiant barrier material adhered thereto. In one case a pre-perforated radiant barrier material was adhered to an OSB substrate. In other experiments apertures were subsequently introduced into a radiant barrier material (without apertures) which had been adhered to an underlying substrate. In each case where adhesive was applied, it was at 1.5 mil. on the screen side of an OSB substrate parallel to the machine direction.

The procedure for conducting the experiments involves 10 readings per sample to determine (A) the initial moisture content of each sample, and (B) the moisture content of each sample after 26 days of drying at 80 degrees F. and 40% relative humidity. The difference between the moisture content values by subtracting (B) from (A) is (C) the loss of moisture of each sample. By dividing the value of (C) by the value of (A), and then multiplying that resultant value by 100, the % Moisture Vapor Permeability (MVP) for each sample ($MVP_n$) can be obtained. In TABLE 1, the $MVP_n$ for each of the Group No. 1–4 samples was compared to the $MVP_n$ for Group 1 samples, i.e., the substrate per se. The $MVP_n$ of the Group 1 samples is defined as "$MVP_1$". In this way, the comparative effect of moisture vapor permeability between the respective samples in each Group 1–4 can be readily determined.

The samples tested were as follows: Samples denoted Group 1 was an OSB substrate per se without a radiant barrier matter adhered thereto. Samples denoted Group 2 replicates the process of U.S. '814, i.e.; a pre-perforated foil sheet subsequently adhered to an OSB substrate. Samples denoted Group 3 had the radiant barrier material adhered to the OSB substrate and then, after the adhesive was substantially cured, was post perforated using a ⅜" pattern to form apertures therein. Samples denoted Group 4 had the radiant barrier material adhered to the OSB substrate and then, before the adhesive was substantially cured, a ¼" pattern was introduced thereinto. In the case of samples denoted Groups 3 and 4, the apertures extended through the foil material and adhesive material, and through the outer surface of the OSB. The data is summarized in TABLE 1

TABLE 1

| Group No. | Description of Samples | $MVP_n$* | $MVP_n/MVP_1$ |
|---|---|---|---|
| 1 | Substrate without foil | 58% | 100% |
| 2 | Substrate with pre-perforated foil | 10% | 17% |

TABLE 1-continued

| Group No. | Description of Samples | MVP$_n$* | MVP$_n$/MVP$_1$ |
|---|---|---|---|
| 3 | Substrate with post-perforated foil (3/8" pattern) | 46% | 81% |
| 4 | Substrate with post-perforated foil (1/4" pattern) | 57% | 99% |

*AVERAGE % MOISTURE VAPOR PERMEABILITY AFTER 26 DAYS OF DRYING (80 DEG. F., 40% R.H.)

The samples denoted as Groups 3 and 4 (which were produced according to the present invention) showed an average % Moisture Vapor Permeability after 26 days of 46% and 57%, respectively, as compared to 58% for the OSB substrate per se without any radiant barrier material adhered thereto. This means that products made according to the present invention exhibited a moisture vapor permeability which were 81% and 99% of the base OSB substrate under comparable conditions over a 26-day drying period. On the other hand, the samples denoted Group 2 (which were produced according to the invention described in U.S. '814) showed an average % Moisture Vapor Permeability after 26 days of only 10%, as compared to 58% for the OSB substrate per se without any foil material adhered thereto. This means that products made according to the teachings of U.S. '814 exhibited an average Moisture Vapor Permeability of only 17% of the base OSB substrate under comparable conditions over a 26-day drying period.

While certain advantageous embodiments have been chosen to illustrate the invention, it will be understood by those skilled in the art that various changes and modifications as can be made therein without departing from the scope of the invention as described in the appended claims.

We claim the following:

1. A method for producing a product which exhibits (a) a low level of emissivity and (b) a high level of moisture vapor permeability, and which enables trapped excess moisture to be transported from the product while maintaining its effective radiant barrier properties, comprising the steps of providing an underlying wood-based substrate having a pair of outer surfaces;

adhering a radiant barrier material to at least one of said pair of outer surfaces of said underlying substrate with an adhesive material to form a radiant barrier material covered substrate; and forming said product by introducing a plurality of apertures into said radiant barrier material covered substrate, said apertures extending substantially completely through both said radiant barrier material and said adhesive material forming substantially completely open moisture vapor flow channels which create a high level of moisture vapor permeability through the radiant barrier material and the adhesive material, permitting a substantial amount of trapped excess moisture to pass from said underlying substrate into the surrounding atmosphere to avoid unwanted degradation of said underlying substrate, while maintaining said low level of emissivity of said product, and minimizing the amount of said radiant barrier material which is removed from said product during forming of said apertures thereby maintaining said low level of emissivity of said product.

2. The method of claim 1, wherein said underlying substrate comprises a structural substrate.

3. The method of claim 1, wherein said underlying substrate comprises a non-structural substrate.

4. The method of claim 1, wherein said degradation of said underlying substrate is caused by moisture-related decay.

5. The method of claim 1, wherein said underlying substrate is selected from a group consisting of moisture-containing substrates, permeable substrates and substrates which are both moisture-containing and permeable.

6. The method of claim 1, wherein the apertures are formed by the step of perforating said radiant barrier material covered product.

7. The method of claim 1, wherein the apertures are shaped in a substantially non-circular pattern.

8. The method of claim 1, wherein the step of introducing said plurality of apertures into said radiant barrier material comprises moving a portion of said radiant barrier material over said apertures, or within the confines of said apertures, for facilitating said low level of emissivity of the product.

9. The method of claim 1, wherein the amount of trapped excess moisture which passes from said underlying substrate of said product into the surrounding atmosphere in a given period of time is at least about 35% of the amount of the amount of trapped excess moisture which passes in the same period of time from the underlying substrate per se.

10. The method of claim 1, wherein the step of introducing said plurality of apertures into said radiant barrier material comprises moving a portion of said radiant barrier material into the confines of said apertures and maintaining said radiant barrier material portion therein without picking a substantial amount of said radiant barrier material portion from within the confines of said apertures for facilitating said low level of emissivity of said product.

11. A method for producing a product which exhibits (a) a low level of emissivity and (b) a high level of moisture vapor permeability, and which enables trapped excess moisture to be transported from the product while maintaining its effective radiant barrier properties, comprising the steps of providing an underlying substrate having a pair of outer surfaces;

adhering a radiant barrier material to at least one of said pair of outer surfaces of said underlying substrate with an adhesive material to form a radiant barrier material covered substrate; and forming said product by introducing a plurality of apertures extending through said radiant barrier material covered substrate and at least one of said outer surfaces, and into said underlying surface, wherein a portion of said radiant barrier material is moved over said apertures, or within the confines of said apertures, for facilitating said low level of emissivity of the product, said apertures extending substantially completely through both said radiant barrier material and said adhesive material thereby forming substantially completely open moisture vapor flow channels which create a high level of moisture vapor permeability through the radiant barrier material and the adhesive material thereby permitting a substantial amount of trapped excess moisture to pass from said underlying substrate to avoid unwanted degradation of said underlying substrate, while maintaining said low level of emissivity of said product.

12. A method for producing a product which exhibits (a) a low level of emissivity and (b) a high level of moisture vapor permeability, and which enables trapped excess moisture to be transported from the product while maintaining its effective radiant barrier properties, comprising the steps of providing an underlying wood-based substrate having a pair of outer surfaces;

adhering a radiant barrier material to at least one of said pair of outer surfaces of said underlying substrate with an adhesive material to form a radiant barrier material covered substrate; and forming said product by introducing a plurality of apertures into said radiant barrier material covered substrate, said apertures extending through said radiant barrier material, through said adhesive material, and through said outer surface into said underlying substrate forming moisture vapor flow channels which create a high level of moisture vapor permeability through the radiant barrier material permitting a substantial amount of trapped excess moisture to pass from said underlying substrate to avoid unwanted degradation of said underlying substrate, while maintaining said low level of emissivity of said product, and minimizing the amount of said radiant barrier material which is removed from said product during forming of said apertures thereby maintaining said low level of emissivity of said product.

13. The method of claim 11, wherein said underlying substrate comprises a structural substrate.

14. The method of claim 11, wherein said underlying substrate comprises a non-structural substrate.

15. The method of claim 11, wherein said degradation of said underlying substrate is caused by moisture-related decay.

16. The method of claim 12, wherein said underlying substrate is selected from a group consisting of moisture-containing substrates, permeable substrates and substrates which are both moisture-containing and permeable.

17. The method of claim 11, wherein the apertures are formed by the step of perforating said radiant barrier material covered product.

18. The method of claim 11, wherein the apertures are shaped in a substantially non-circular pattern.

19. The method of claim 11, wherein the step of introducing said plurality of apertures into said radiant barrier material comprises moving a portion of said radiant barrier material over said apertures, or within the confines of said apertures, for facilitating said low level of emissivity of the product.

20. The method of claim 11, wherein the amount of trapped excess moisture which passes from said underlying substrate of said product into the surrounding atmosphere in a given period of time is at least about 35% of the amount of the amount of trapped excess moisture which passes in the same period of time from the underlying substrate per se.

21. The method of claim 11, wherein the step of introducing said plurality of apertures into said radiant barrier material comprises moving a portion of said radiant barrier material into the confines of said apertures and maintaining said radiant barrier material portion therein without picking a substantial amount of said radiant barrier material portion from within the confines of said apertures for facilitating said low level of emissivity of said product.

22. A product which exhibits (a) a low level of emissivity and (b) a high level of moisture vapor permeability, and which enables trapped excess moisture to be transported from the product while maintaining its effective radiant barrier properties, comprising an underlying wood-based substrate having a pair of outer surfaces;

a radiant barrier material adhered to at least one of said pair of outer surfaces of said underlying substrate with an adhesive material to form a radiant barrier material covered substrate; and a plurality of apertures formed in said radiant barrier material covered substrate, said apertures extending substantially completely through both said radiant barrier material and said adhesive material forming substantially completely open moisture vapor flow channels, which create a high level of moisture vapor permeability through the radiant barrier material and the adhesive material, and which permit a substantial amount of trapped excess moisture to pass from said underlying substrate to avoid unwanted degradation of said underlying substrate, while maintaining said low level of emissivity of said product, the amount of said radiant barrier material which is removed from said product being minimized thereby maintaining said low level of emissivity of said product.

23. A product which exhibits (a) a low level of emissivity and (b) a high level of moisture vapor permeability, and which enables trapped excess moisture to be transported from the product while maintaining its effective radiant barrier properties, comprising an underlying wood-based substrate having a pair of outer surfaces;

a radiant barrier material adhered to at least one of said pair of outer surfaces of said underlying substrate with an adhesive material to form a radiant barrier material covered substrate; and a plurality of apertures extending into said radiant barrier material covered substrate, said apertures extending through said radiant barrier material, through said adhesive material, and through said surface into said underlying substrate forming moisture vapor flow channels which create a high level of moisture vapor permeability through the radiant barrier material permitting a substantial amount of trapped excess moisture to pass from said underlying substrate to avoid unwanted degradation of said underlying substrate, while maintaining said low level of emissivity of said product, the amount of said radiant barrier material which is removed from said product being minimized thereby maintaining said low level of emissivity of said product.

24. A method for producing a product which exhibits (a) a low level of emissivity and (b) a high level of moisture vapor permeability, and which enables trapped excess moisture to be transported from the product to the surrounding atmosphere while maintaining its effective radiant barrier properties, comprising the steps of providing an underlying substrate having a pair of outer major surfaces;

adhering a radiant barrier material to at least one of said pair of outer major surfaces of said underlying substrate with an adhesive material to form a radiant barrier material covered substrate; and forming said product by introducing a plurality of apertures into said radiant barrier material covered substrate and moving a portion of said radiant barrier material over said apertures, or within the confines of said apertures, for facilitating said low level of emissivity of the product, said apertures extending through said radiant barrier material, through said adhesive material, and through said major surface into said underlying substrate thereby forming moisture vapor flow channels which create a high level of moisture vapor permeability through the radiant barrier material thereby permitting a substantial amount of trapped excess moisture to pass from said underlying substrate into the surrounding atmosphere to avoid unwanted degradation of said underlying substrate, while maintaining said low level of emissivity of said product.

25. A method for producing a product which exhibits (a) a low level of emissivity and (b) a high level of moisture vapor permeability, and which enables trapped excess moisture to be transported from the product while maintaining its effective radiant barrier properties, comprising the steps of providing an underlying substrate having a pair of outer surfaces;

adhering a radiant barrier material to at least one of said pair of outer surfaces of said underlying substrate with an adhesive material to form a radiant barrier material covered substrate; and forming said product by introducing a plurality of apertures extending through said radiant barrier material covered substrate and at least one of said outer surfaces, and into said underlying substrate, wherein a portion of said radiant barrier material is moved over said apertures, or within the confines of said apertures, said apertures extending substantially completely through both said radiant barrier material and said adhesive material forming substantially completely open moisture vapor flow channels which create a high level of moisture vapor permeability through the radiant barrier material and the adhesive material, permitting a substantial amount of trapped excess moisture to pass from said underlying substrate to avoid unwanted degradation of said underlying substrate, while maintaining said low level of emissivity of said product.

26. A method for producing a product which exhibits (a) a low level of emissivity and (b) a high level of moisture vapor permeability, and which enables trapped excess moisture to be transported from the product while maintaining its effective radiant barrier properties, comprising the steps of providing an underlying substrate having a pair of outer surfaces;

adhering a radiant barrier material to at least one of said pair of outer surfaces of said underlying substrate with an adhesive material to form a radiant barrier material covered substrate; and forming said product by introducing a plurality of apertures into said radiant barrier material covered substrate, a portion of said radiant barrier material being moved into the confines of said apertures and maintaining said radiant barrier material portion therein without picking a substantial amount of said radiant barrier material portion from within the confines of said apertures for facilitating said low level of emissivity of said product, said apertures extending substantially completely through both said radiant barrier material and said adhesive material forming substantially completely open moisture vapor flow channels which create a high level of moisture vapor permeability through the radiant barrier material and the adhesive material, permitting a substantial amount of trapped excess moisture to pass from said underlying substrate to avoid unwanted degradation of said underlying substrate, while maintaining said low level of emissivity of said product.

27. A method for producing a product which exhibits (a) a low level of emissivity and (b) a high level of moisture vapor permeability, and which enables trapped excess moisture to be transported from the product while maintaining its effective radiant barrier properties, comprising the steps of providing an underlying substrate having a pair of outer surfaces;

adhering a radiant barrier material to at least one of said pair of outer surfaces of said underlying substrate with an adhesive material to form a radiant barrier material covered substrate; and forming said product by introducing a plurality of apertures into said radiant barrier material covered substrate, a portion of said radiant barrier material being moved into the confines of said apertures and maintaining said radiant barrier material portion therein without picking a substantial amount of said radiant barrier material portion from within the confines of said apertures for facilitating said low level of emissivity of said product, said apertures extending through said radiant barrier material, through said adhesive material, and through said outer surface into said underlying substrate forming moisture vapor flow channels which create a high level of moisture vapor permeability through the radiant barrier material permitting a substantial amount of trapped excess moisture to pass from said underlying substrate to avoid unwanted degradation of said underlying substrate, while maintaining said low level of emissivity of said product.

28. A method for producing a product which exhibits (a) a low level of emissivity and (b) a high level of moisture vapor permeability, and which enables trapped excess moisture to be transported from the product while maintaining its effective radiant barrier properties, comprising the steps of providing an underlying substrate having a pair of outer surfaces;

adhering a radiant barrier material to at least one of said pair of outer surfaces of said underlying substrate with an adhesive material to form a radiant barrier material covered substrate; and forming said product by introducing a plurality of apertures into said radiant barrier material covered substrate, a portion of said radiant barrier material being moved into the confines of said apertures and maintaining said radiant barrier material portion therein without picking a substantial amount of said radiant barrier material portion from within the confines of said apertures for facilitating said low level of emissivity of said product, said apertures extending through said radiant barrier material, through said adhesive material, and through said outer surface into said underlying substrate forming moisture vapor flow channels which create a high level of moisture vapor permeability through the radiant barrier material permitting a substantial amount of trapped excess moisture to pass from said underlying substrate to avoid unwanted degradation of said underlying substrate, while maintaining said low level of emissivity of said product.

29. A product which exhibits (a) a low level of emissivity and (b) a high level of moisture vapor permeability, and which enables trapped excess moisture to be transported from the product while maintaining its effective radiant barrier properties, comprising an underlying wood-based substrate having a pair of outer surfaces;

a radiant barrier material adhered to at least one of said pair of outer surfaces of said underlying substrate with an adhesive material to form a radiant barrier material covered substrate; and a plurality of apertures formed in said radiant barrier material covered substrate, a portion of said radiant barrier material being moved into the confines of said apertures and maintaining said radiant barrier material portion therein without picking a substantial amount of said radiant barrier material portion from within the confines of said apertures for facilitating said low level of emissivity of said product, said apertures extending substantially completely through both said radiant barrier material and said adhesive material and into said underlying substrate thereby forming substantially completely open moisture vapor flow channels, creating a high level of moisture vapor permeability through the radiant barrier material and the adhesive material, and permitting a substantial amount of trapped excess moisture to pass from said underlying to avoid unwanted degradation of said underlying substrate, while maintaining said low level of emissivity of said product.

30. The method of claim 11, wherein the apertures are formed by the step of perforating said radiant barrier material covered product.

31. The method of claim 30, wherein the step of perforating comprises incising said radiant barrier material covered product.

32. The method of claim 24, wherein the apertures are formed by the step of perforating said radiant barrier material covered product.

33. The method of claim 32, wherein the step of perforating comprises incising said radiant barrier material covered product.

34. The method of claim 25, wherein the apertures are formed by the step of perforating said radiant barrier material covered product.

35. The method of claim 34, wherein the step of perforating comprises incising said radiant barrier material covered product.

36. The method of claim 26, wherein the apertures are formed by the step of perforating said radiant barrier material covered product.

37. The method of claim 36, wherein the step of perforating comprises incising said radiant barrier material covered product.

38. The method of claim 27, wherein the apertures are formed by the step of perforating said radiant barrier material covered product.

39. The method of claim 38, wherein the step of perforating comprises incising said radiant barrier material covered product.

40. The method of claim 28, wherein the apertures are formed by the step of perforating said radiant barrier material covered product.

41. The method of claim 40, wherein the step of perforating comprises incising said radiant barrier material covered product.

42. The product of claim 22, wherein the apertures comprise perforations.

43. The product of claim 42, wherein the perforations comprise incisions.

44. The product of claim 23, wherein the apertures comprise perforations.

45. The product of claim 44, wherein the perforations comprise incisions.

46. The product of claim 29, wherein the apertures comprise perforations.

47. The product of claim 46, wherein the perforations comprise incisions.

* * * * *